US 6,715,711 B1

(12) United States Patent
Muylaert et al.

(10) Patent No.: US 6,715,711 B1
(45) Date of Patent: Apr. 6, 2004

(54) HUB-PROTECTING CAP FOR A HELICOPTER TAIL ROTOR

(75) Inventors: Neal W. Muylaert, Apache Junction, AZ (US); Christopher T. Duffield, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/405,779

(22) Filed: Apr. 1, 2003

Related U.S. Application Data

(63) Continuation-in-part of application No. 10/328,443, filed on Dec. 23, 2002.

(51) Int. Cl.$^7$ .............................................. B64C 27/82
(52) U.S. Cl. ...................................... 244/17.19; 244/1 R
(58) Field of Search ........................... 244/17.11, 17.19, 244/17.21, 17.23, 129.1, 1 R; 150/154, 157, 166; 416/142, 143, 247 R, 245 R

(56) References Cited

PUBLICATIONS http://www.b–domke.de/AviationImages/Apache/3968.html and 5323.html.*
http://www.b–domke.de/AviationImages/Rotorhead/1077.html and 1079.html.*
http://www.bearingbuddy.com/bra.html.*

* cited by examiner

Primary Examiner—Peter M. Poon
Assistant Examiner—Timothy D. Collins
(74) Attorney, Agent, or Firm—Thompson Coburn LLP

(57) ABSTRACT

A hub-protecting cap for use with a helicopter. The helicopter has a fuselage, a tail rotor assembly operatively coupled to the fuselage for rotation relative to the fuselage about a tail rotor axis, at least one tail rotor blade detachably connected to the tail rotor assembly, a retention pin, and a pitch control link mechanism. The hub-protecting cap comprises a cap body portion, a pin-receiving aperture, and a link-attaching portion. The cap body portion is adapted to be attached to a hub portion of the tail rotor assembly in a manner to cover the hub portion when the tail rotor blade is detached from the tail rotor assembly. The cap body portion has a hub socket adapted such that pitch change bearing surfaces of the hub portion are within the hub socket of the cap body portion when the cap body portion is attached to the hub portion. The pin-receiving aperture is through the cap body portion. The pin-receiving aperture is sized and located to align with a portion of a retention strap of the tail rotor assembly and to receive a retention pin when the cap body portion is attached to the hub portion. The link-attaching portion extends from the cap body portion. The link-attaching portion is sized and adapted for attachment to a pitch control link mechanism of the tail rotor assembly when the cap body portion is attached to the hub portion.

24 Claims, 2 Drawing Sheets

HUB-PROTECTING CAP FOR A HELICOPTER TAIL ROTOR

CROSS-REFERENCE TO RELATED APPLICATION

This application is a continuation-in-part of U.S. application Ser. No. 10/328,443, filed on Dec. 23, 2002. The application is hereby incorporated by reference herein.

BACKGROUND OF THE INVENTION

A typical helicopter includes a fuselage having a forward section and a tail boom section, a main rotor assembly extending out from the forward section of the fuselage, a plurality of main rotor blades coupled to the main rotor assembly, a tail rotor assembly extending out from the tail boom section of the fuselage, and a plurality of tail rotor blades coupled to the tail rotor assembly. An Apache helicopter has four tail rotor blades detachably connected to the tail rotor assembly.

SUMMARY OF THE INVENTION

A method of the present invention comprises providing a helicopter and providing a hub-protecting cap. The helicopter has a fuselage, a tail rotor assembly operatively coupled to the fuselage for rotation relative to the fuselage about a tail rotor axis, and at least one tail rotor blade detachably connected to the tail rotor assembly. The tail rotor assembly comprises a hub portion having a pitch change bearing surface. The tail rotor blade has a hub socket. The pitch change bearing surface of the hub portion is within the hub socket of the tail rotor blade. The pitch change bearing surface engages the tail rotor blade in a manner to permit movement of the tail rotor blade relative to the hub portion about a blade pitch change axis. The hub-protecting cap has a cap body portion. The cap body portion has a hub socket. The method further comprises removing the tail rotor blade from the tail rotor assembly and attaching the hub-protecting cap to the tail rotor assembly in a manner such that the pitch change bearing surface of the hub portion is within the hub socket of the hub-protecting cap. The attachment of the hub-protecting cap to the tail rotor assembly occurs after removal of the tail rotor blade from the tail rotor assembly.

Another aspect of the present invention is an assembly comprising a helicopter and a hub-protecting cap. The helicopter has a fuselage, a tail rotor assembly operatively coupled to the fuselage for rotation relative to the fuselage about a tail rotor axis, and a first tail rotor blade detachably connected to the tail rotor assembly. The tail rotor assembly comprises a first hub portion and a second hub portion. Each of the first and second hub portions is adapted to receive a tail rotor blade. The first hub portion has a pitch change bearing surface. The second hub portion has a pitch change bearing surface. The first tail rotor blade has a hub socket. The pitch change bearing surface of the first hub portion is within the hub socket of the first tail rotor blade and engages the first tail rotor blade in a manner to permit movement of the first tail rotor blade relative to the hub portion about a first blade pitch change axis. The pitch change bearing surface of the second hub portion is adapted to be within a hub socket of a second tail rotor blade. The helicopter is in a tail rotor blade removed configuration in which the second hub portion is free of any tail rotor blade. The hub-protecting cap includes a cap body portion having a hub socket. The pitch change bearing surface of the second hub portion is within the hub socket of the hub-protecting cap.

Another aspect of the present invention is a hub-protecting cap for use with a helicopter. The helicopter has a fuselage, a tail rotor assembly operatively coupled to the fuselage for rotation relative to the fuselage about a tail rotor axis, at least one tail rotor blade detachably connected to the tail rotor assembly, a retention pin, and a pitch control link mechanism. The tail rotor assembly includes a hub portion and a portion of a retention strap assembly extending out from the hub portion. The hub portion has a pitch change bearing surface. The tail rotor blade has a hub socket. The hub portion is adapted to receive the tail rotor blade. The pitch change bearing surface of the hub portion is within the hub socket of the tail rotor blade when the hub portion is in receipt of the tail rotor blade. The pitch change bearing surface is adapted to engage the tail rotor blade in a manner to permit movement of the tail rotor blade relative to the hub portion about a blade pitch change axis. The retention pin is adapted to extend from the tail rotor blade to the portion of the retention strap in a manner to detachably secure the tail rotor blade to the portion of the retention strap. The pitch control link mechanism is adapted to move the tail rotor blade about the blade pitch change axis. The hub-protecting cap comprises a cap body portion, a pin-receiving aperture, and a link-attaching portion. The cap body portion is adapted to be attached to the hub portion in a manner to cover the hub portion when the tail rotor blade is detached from the tail rotor assembly. The cap body portion has a hub socket adapted such that the pitch change bearing surface of the hub portion is within the hub socket of the cap body portion when the cap body portion is attached to the hub portion. The pin-receiving aperture is through the cap body portion. The pin-receiving aperture is sized and located to align with the portion of the retention strap and to receive the retention pin when the cap body portion is attached to the hub portion. The link-attaching portion extends from the cap body portion. The link-attaching portion is sized and adapted for attachment to the pitch control link mechanism when the cap body portion is attached to the hub portion.

Other features and advantages will be in part apparent and in part pointed out hereinafter.

BRIEF DESCRIPTION OF DRAWINGS

Corresponding reference characters indicate corresponding parts throughout the several views of the drawings.

DETAILED DESCRIPTION OF THE PREFERRED EMBODIMENTS

Figure 1:
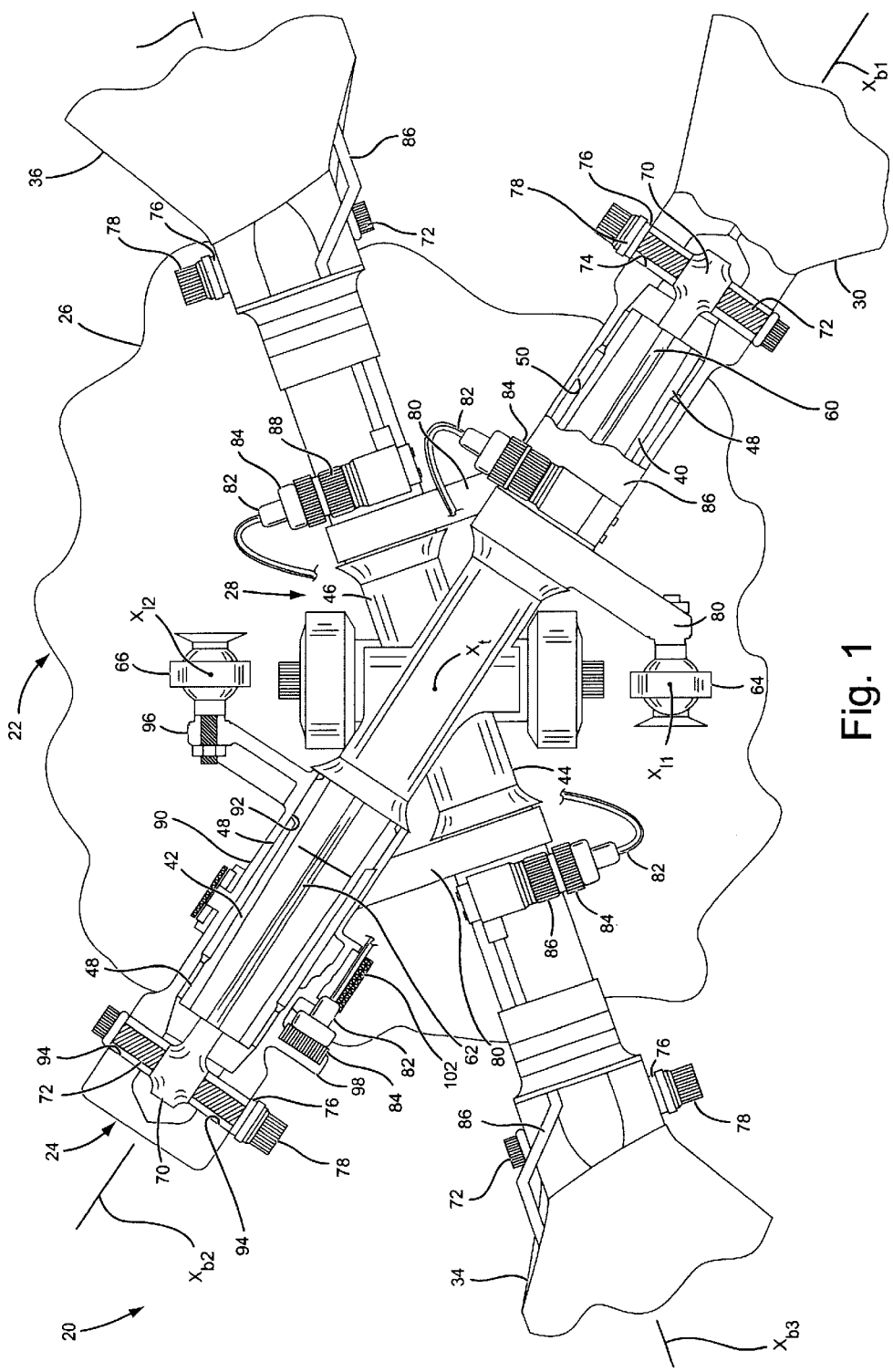
FIG. 1 is a fragmented side elevational view of an assembly of the present invention with portions broken away to show detail, the assembly comprising a helicopter and a hub-protecting cap.

Referring now to the drawings, and more particularly to FIG. 1, an assembly of the present invention is indicated in its entirety by the reference numeral 20. The assembly 20 comprises a helicopter, generally indicated at 22, and a hub-protecting cap, generally indicated at 24. The helicopter 22 is preferably an Apache helicopter comprising a fuselage 26, a tail rotor assembly, generally indicated at 28, operatively coupled to the fuselage for rotation relative to the fuselage about a tail rotor axis $X_t$, and first, third, and fourth tail rotor blades, generally indicated at 30, 34, 36, respectively, detachably connected to the tail rotor assembly.

The tail rotor assembly 28 comprises first, second, third and fourth hub portions 40, 42, 44, 46 adapted for receiving the tail rotor blades. It is to be understood that the helicopter has four tail rotor blades attached to the four hubs 40, 42, 44, 46 during operation of the helicopter. In other words, a second tail rotor blade (not shown) is attached to the second hub portion 42 during operation of the helicopter 22. However, a user may deem it desirable to remove one or more of the tail rotor blades 30 from the hub portion(s) 34 during storage or transportation of the helicopter 22. The hub-protecting cap 24 is adapted to be attached to one of the hub portions after a tail rotor blade is detached from such hub portion to protect the hub and other components of the tail rotor assembly 28 during storage or transportation of the helicopter 22. In the assembly of FIG. 1, the hub-protecting cap 24 is attached to the second hub portion 42. Although the assembly of FIG. 1 includes three rotor blades 30, 34, 36 and one hub-protecting cap 24, it is to be understood that one or more of the three rotor blades may be replaced with one or more additional hub-protecting caps without departing from the scope of this invention. The helicopter 22 is shown in FIG. 1 in a tail rotor blade removed configuration in which the second hub portion 42 is free of any tail rotor blade.

Each hub portion 40, 42, 44, 46 preferably has two pitch change bearing surfaces 48. Each tail rotor blade 30, 34, 36 has a hub socket 50 at its proximal end. When the tail rotor blades 30, 34, 36 are attached to their corresponding hub portions 40, 44, 46, the pitch change bearing surfaces 48 of the hub portions are within the hub sockets 50 of the tail rotor blades. The pitch change bearing surfaces 48 engage the tail rotor blades 30, 34 36 in a manner to permit movement of the first, third and fourth tail rotor blades 30, 34, 36 relative to the hub portions about first, third and fourth blade pitch change axes $X_{b1}$, $X_{b3}$, $X_{b4}$. The pitch change bearing surfaces 48 of the second hub portion 42 are adapted to engage the second tail rotor blade (not shown) in a manner to permit movement of the second tail rotor blade relative to the second hub portion about a second blade pitch change axis $X_{b2}$. The tail rotor assembly further comprises four retentions strap assemblies and four pitch control link mechanisms. FIG. 1 shows portions of only first and second retention strap assemblies 60, 62 and portions of only first and second pitch control link mechanisms 64, 66. However, it is to be understood that retention strap assemblies and pitch control link mechanisms are also associated with the third and fourth tail rotor blades 34, 36. The retention strap assemblies are adapted for maintaining the tail rotor blades on the hub portions. The pitch control link mechanisms are adapted for pivoting the tail rotor blades about the blade pitch change axes. The tail rotor blades 30, 34, 36 are secured to the end portions 70 of the retention strap assemblies via retention pins (or retention bolts) 72. The retention bolts 72 extend through pin-receiving apertures 74 through the tail rotor blades and through the end portions 70 of the retention strap assemblies and are maintained therein via retention washers 76 and retention nuts 78. Preferably, cotter pins (not shown) extend through the washers 76 and through the retention bolts 72 to ensure that the retention bolts do not detach from the tail rotor blades and retention strap assemblies during operation of the helicopter.

Each tail rotor blade 30, 34, 36 includes a laterally extending link-attaching portion 80 adapted to be connected to its associated pitch control link mechanism. As shown in FIG. 1, the link-attaching portion 80 of the first tail rotor blade 30 is connected to an end portion of the first pitch control link mechanism 64. To change the pitch of the first tail rotor blade 30, the first pitch control link mechanism 64 (only the end portion of which is shown in FIG. 1) is moved generally along a first link mechanism axis $X_{l1}$ to turn the first tail rotor blade about the first blade pitch change axis $X_{b1}$. The end portion of the second pitch control link mechanism 66 is movable generally along a second link mechanism axis $X_{l2}$. The pitch of the other tail rotor blades is changed in a similar manner. The tail rotor assembly 28 further comprises four electrical harnesses 82 each having an electrical connector 84. Each of the tail rotor blades 30, 34, 36 preferably includes a de-ice mechanism 86 having an electrical connector 88. The electrical connectors 88 of the de-ice mechanisms 86 are adapted to connect to the connectors 84 of the electrical harnesses 82 in a manner to electrically couple the electrical harnesses to the de-ice mechanisms. Preferably, the de-ice mechanisms 86 comprise electrical resistance heating elements.

Figure 2:
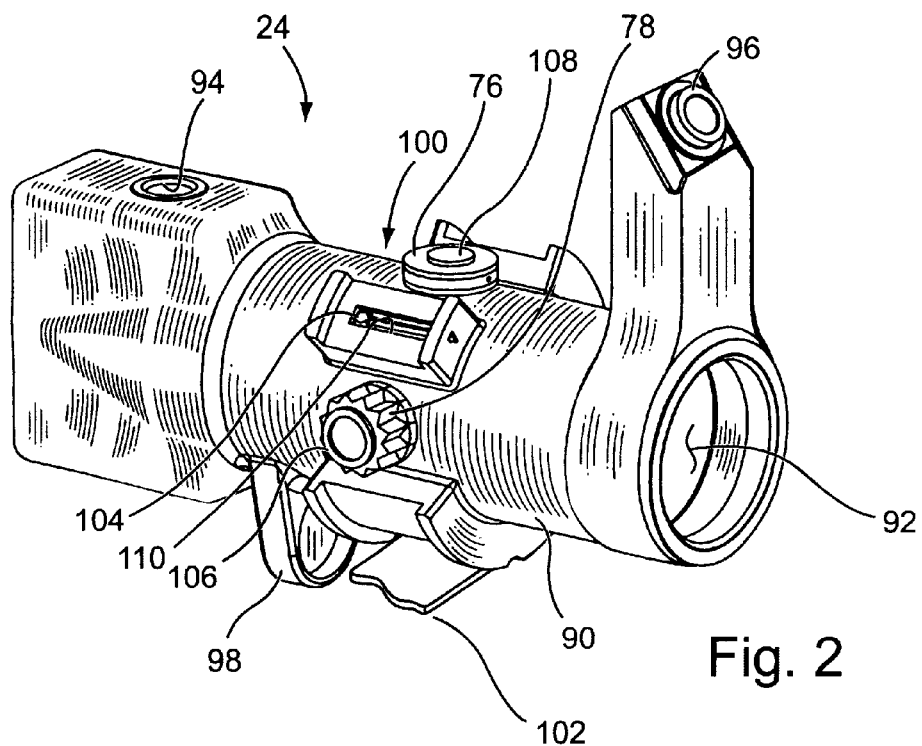
FIG. 2 is a perspective view of the hub-protecting cap of FIG. 1 with reassembly hardware attached to the hub-protecting cap.
Figure 3:
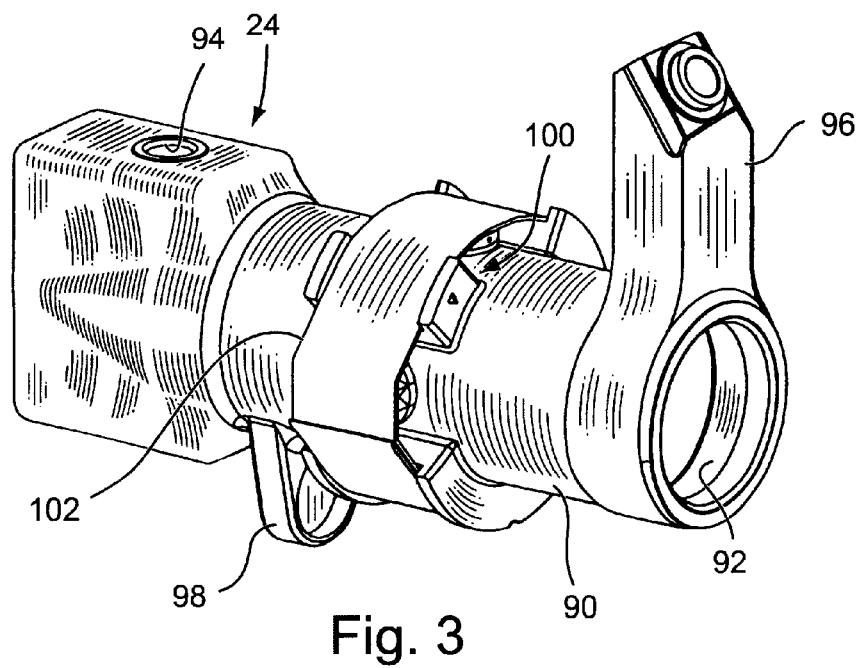
FIG. 3 is a perspective view similar to that of FIG. 2 but showing a flexible strap wrapped around the reassembly hardware.

Referring now to FIGS. 1–3, the hub-protecting cap 24 preferably comprises a cap body portion 90 having a hub socket 92, pin-receiving apertures 94 extending through the cap body portion, a link-attaching portion 96 extending generally laterally from the cap body portion, an electrical harness-receiving portion 98 extending from the cap body portion, a hardware-receiving portion, generally indicated at 100, and a flexible strap 102.

Preferably, the hub socket 92 of the hub-protecting cap 24 is substantially the same size and shape as the hub socket 50 of the tail rotor blades such that the pitch change bearing surfaces 48 of the second hub portion 42 is within the hub socket of the hub-protecting cap when the hub protecting cap is connected to the second hub portion. The cap body portion 90 is adapted to protect the pitch change bearing surfaces 48 of the second hub portion 42. The pin-receiving apertures 94 of the hub-protecting cap 24 are positioned substantially the same as the pin-receiving apertures 74 of the tail rotor blades. The hub-protecting cap 24 is secured to the end portion 70 of the second retention strap assembly 62 via one of the retention bolts 72. The retention bolt 72 extends through the pin-receiving apertures 94 of the hub-protecting cap 24 and through the end portion 70 of the second retention strap assembly 62 and is maintained therein via one of the retention washers 76 and one of the retention nuts 78.

Preferably the link-attaching portion 96 has substantially the same shape as the link-attaching portions 80 of the tail rotor blades. With the hub-protecting cap 24 secured to the second hub portion 42, the link-attaching portion 96 of the hub-protecting cap is secured to the end portion of the second pitch control link mechanism 66 to protect the second pitch control link mechanism during storage or transportation of the helicopter 22. The electrical harness-receiving portion 98 is adapted for receiving the electrical connector 84 of the electrical harness 82 associated with the second hub portion 42.

When a tail rotor blade is detached from the tail rotor assembly 28, it is generally undesirable to reuse the retention nut 78, retention washer 76 and retention cotter pin. Preferably, these hardware items are replaced with a new (unused) retention nut 76, a new retention washer 78 and a new retention cotter pin 104. As shown in FIG. 2, the hardware-receiving portion 100 of the hub-protecting cap 24 preferably comprises a nut-receiving stem 106 adapted for storage of the new retention nut 78, 4, a washer-receiving stem 108 adapted for storage of the new retention washer 76, and a cotter pin-receiving opening 110 adapted for storage of the new retention cotter pin 104. The flexible strap 102 (FIG. 3) is adapted to wrap around the cap body portion 90 to retain the new hardware on the hardware-receiving portion 100. Preferably, the flexible strap 102 includes hook and loop type fasteners to secure the flexible strap in place.

In use, the second tail rotor blade (not shown) is detached from the end portion 70 of the second retention strap assembly 62, detached from the second pitch control link mechanism 66, and detached from the electrical harness 82 associated with the second tail rotor blade to place the helicopter 22 in its tail rotor blade removed configuration. With the helicopter 22 in its tail rotor blade removed configuration, the hub-protecting cap 24 is attached to the tail rotor assembly 28. In particular, the cap body portion 90 is attached to the end portion 70 of the second retention strap assembly 62 via the appropriate hardware, the link-attaching portion 96 is attached to the second pitch control link mechanism 66 and the electrical connector 84 of the electrical harness 82 is inserted in the electrical harness-receiving portion 98. The new hardware items (adapted for later use in a blade reattachment operation) are positioned in the hardware-receiving portion 100 and the flexible strap 102 is wrapped around the cap body portion 90. Preferably, the flexible strap 102 is also wrapped around the electrical harness 82 to secure the electrical harness to the hub-protecting cap 24. With the hub-protecting cap 24 so attached to the tail rotor assembly 28, the helicopter 22 may be stored or transported for later deployment. To deploy the helicopter 22, the hub-protecting cap 24 is detached from the tail rotor assembly 28 and the second tail rotor blade (not shown) is reattached using the new hardware that was stored on the hardware-receiving portion 100 of the hub-protecting cap. Thus, the hub-protecting cap 24 helps protect the tail rotor assembly 28 against damage during storage and transportation of the helicopter 22.

In view of the above, it will be seen that several advantageous results are attained by the present invention.

As various changes could be made in the above, constructions and methods without departing from the scope of the invention, it is intended that all matter contained in the above description or shown in the accompanying drawings shall be interpreted as illustrative and not in a limiting sense. The invention therefore shall be limited solely by the scope of the claims set forth below.

What is claimed is:

1. A method comprising:

providing a helicopter having a fuselage, a tail rotor assembly operatively coupled to the fuselage for rotation relative to the fuselage about a tail rotor axis, and at least one tail rotor blade detachably connected to the tail rotor assembly, the tail rotor assembly comprising a hub portion having a pitch change bearing surface, the tail rotor blade having a hub socket, the pitch change bearing surface of the hub portion being within the hub socket of the tail rotor blade, the pitch change bearing surface engaging the tail rotor blade in a manner to permit movement of the tail rotor blade relative to the hub portion about a blade pitch change axis;

providing a hub-protecting cap having a cap body portion, the cap body portion having a hub socket;

removing the tail rotor blade from the tail rotor assembly;

attaching the hub-protecting cap to the tail rotor assembly in a manner such that the pitch change bearing surface of the hub portion is within the hub socket of the hub-protecting cap;

the step of attaching the hub-protecting cap to the tail rotor assembly occurring after the step of removing the tail rotor blade from the tail rotor assembly.

2. A method as set forth in claim 1 wherein:

the tail rotor blade further comprises a pin-receiving aperture;

the tail rotor assembly further comprises a retention pin and a portion of a retention strap assembly extending out from the hub portion, the retention pin extending through the pin-receiving aperture of the tail rotor blade and through the portion of the retention strap assembly when the tail rotor blade is connected to the tail rotor assembly;

the hub-protecting cap further comprises a pin-receiving aperture;

the step of removing the tail rotor blade from the tail rotor assembly includes removing the retention pin from the pin-receiving aperture of the tail rotor blade and from the portion of the retention strap assembly;

the step of attaching the hub-protecting cap to the tail rotor assembly includes inserting the retention pin into the pin-receiving aperture of the hub-protecting cap and into the portion of the retention strap assembly in a manner to secure the hub-protecting cap to the portion of the retention strap assembly.

3. A method as set forth in claim 1 wherein:

the tail rotor assembly further comprises a pitch control link mechanism; and the step of attaching the hub-protecting cap to the tail rotor assembly includes attaching a portion of the hub-protecting cap to the pitch control link mechanism.

4. A method as set forth in claim 3 wherein:

the tail rotor blade further comprises a pin-receiving aperture;

the tail rotor assembly further comprises a retention pin and a portion of a retention strap assembly extending out from the hub portion, the retention pin extending through the pin-receiving aperture of the tail rotor blade and through the portion of the retention strap assembly when the tail rotor blade is connected to the tail rotor assembly;

the hub-protecting cap further comprises a pin-receiving aperture;

the step of removing the tail rotor blade from the tail rotor assembly includes removing the retention pin from the pin-receiving aperture of the tail rotor blade and from the portion of the retention strap assembly;

the step of attaching the hub-protecting cap to the tail rotor assembly includes inserting the retention pin into the pin-receiving aperture of the hub-protecting cap and into the portion of the retention strap assembly in a manner to secure the hub-protecting cap to the portion of the retention strap assembly.

5. A method as set forth in claim 4 wherein:

the tail rotor blade further comprises an electrically operable de-ice mechanism, the tail rotor assembly further comprises an electrical harness electrically coupled to the de-ice mechanism of the tail rotor blade when the tail rotor blade is connected to the tail rotor assembly;

the hub-protecting cap further comprises an electrical harness-receiving portion;

the step of removing the tail rotor blade from the tail rotor assembly includes electrically decoupling the electrical harness of the tail rotor assembly from the de-ice mechanism of the tail rotor blade;

the step of attaching the hub-protecting cap to the tail rotor assembly further includes connecting the electrical harness to the electrical harness-receiving portion of the of the hub-protecting cap.

6. A method as set forth in claim 1 further comprising:

removing the hub-protecting cap from the tail rotor assembly; and reconnecting the tail rotor blade to the tail rotor assembly.

7. A method as set forth in claim 6 further comprising attaching hardware to the hub-protecting cap, the hardware being adapted to facilitate reconnection of the tail rotor blade to the tail rotor assembly, the step of attaching the hardware to the hub-protecting cap occurring before the step of attaching the hub-protecting cap to the tail rotor assembly.

8. A method as set forth in claim 6 further comprising:

providing hardware adapted to facilitate reconnection of the tail rotor blade to the tail rotor assembly, the hardware comprising a washer, a nut, and a cotter pin; and attaching the hardware to the hub-protecting cap.

9. A method as set forth in claim 8 wherein the step of attaching the hardware to the hub-protecting cap occurs before the step of attaching the hub-protecting cap to the tail rotor assembly.

10. A method as set forth in claim 8 further comprising wrapping a flexible strap around the hub-protecting cap in a manner such that the flexible strap covers the hardware.

11. A method as set forth in claim 6 further comprising:

providing hardware adapted to facilitate reconnection of the tail rotor blade to the tail rotor assembly;

attaching the hardware to the hub-protecting cap; and wrapping a flexible strap around the hub-protecting cap in a manner such that the flexible strap covers the hardware.

12. An assembly comprising:

a helicopter having a fuselage, a tail rotor assembly operatively coupled to the fuselage for rotation relative to the fuselage about a tail rotor axis, a first tail rotor blade detachably connected to the tail rotor assembly, the tail rotor assembly comprising a first hub portion and a second hub portion, each of the first and second hub portions being adapted to receive a tail rotor blade, the first hub portion having a pitch change bearing surface, the second hub portion having a pitch change bearing surface, the first tail rotor blade having a hub socket, the pitch change bearing surface of the first hub portion being within the hub socket of the first tail rotor blade and engaging the first tail rotor blade in a manner to permit movement of the first tail rotor blade relative to the hub portion about a first blade pitch change axis, the pitch change bearing surface of the second hub portion being adapted to be within a hub socket of a second tail rotor blade, the helicopter being in a tail rotor blade removed configuration in which the second hub portion is free of any tail rotor blade; and a hub-protecting cap having a cap body portion, the cap body portion having a hub socket, the pitch change bearing surface of the second hub portion being within the hub socket of the hub-protecting cap.

13. An assembly as set forth in claim 12 wherein:

the tail rotor assembly further comprises a retention pin and a portion of a retention strap assembly extending out from the second hub portion;

the hub-protecting cap further comprises a pin-receiving aperture, the retention pin being in the pin-receiving aperture of the hub-protecting cap and in the portion of the retention strap assembly in a manner which secures the hub-protecting cap to the portion of the retention strap assembly.

14. An assembly as set forth in claim 12 wherein the tail rotor assembly further comprises a pitch control link mechanism associated with the second hub portion, and the hub-protecting cap further comprises a link-attaching portion attached to the pitch control link mechanism.

15. An assembly as set forth in claim 14 wherein:

the tail rotor assembly further comprises a retention pin and a portion of a retention strap assembly extending out from the second hub portion;

the hub-protecting cap further comprises a pin-receiving aperture, the retention pin being in the pin-receiving aperture of the hub-protecting cap and in the portion of the retention strap assembly in a manner which secures the hub-protecting cap to the portion of the retention strap assembly.

16. An assembly as set forth in claim 12 wherein:

the tail rotor assembly further comprises an electrical harness adapted to be electrically coupled to a de-ice mechanism of a tail rotor blade;

the hub-protecting cap further comprises an electrical harness-receiving portion, the electrical harness being attached to the electrical harness-receiving portion.

17. An assembly as set forth in claim 12 further comprising hardware adapted to facilitate connection of a tail rotor blade to the second hub portion of the tail rotor assembly upon removal of the hub-protecting cap from the second hub portion, the hardware being attached to the hub-protecting cap.

18. An assembly as set forth in claim 17 wherein the hardware comprising a washer, a nut, and a cotter pin.

19. An assembly as set forth in claim 18 wherein the washer, nut and cotter pin are attached to the hub-protecting cap in a manner such that the washer, nut and cotter pin are spaced from one another.

20. An assembly as set forth in claim 17 wherein the hub-protecting cap further comprises a flexible strap wrapped around the cap body portion in a manner such that the flexible strap covers the hardware.

21. A hub-protecting cap for use with a helicopter, the helicopter having a fuselage, a tail rotor assembly operatively coupled to the fuselage for rotation relative to the fuselage about a tail rotor axis, at least one tail rotor blade detachably connected to the tail rotor assembly, a retention pin, and a pitch control link mechanism, the tail rotor assembly including a hub portion and a portion of a retention strap assembly extending out from the hub portion, the hub portion having a pitch change bearing surface, the tail rotor blade having a hub socket, the hub portion being adapted to receive the tail rotor blade, the pitch change bearing surface of the hub portion being within the hub-socket of the tail rotor blade when the hub portion is in receipt of the tail rotor blade, the pitch change bearing surface being adapted to engage the tail rotor blade in a manner to permit movement of the tail rotor blade relative to the hub portion about a blade pitch change axis, the retention pin being adapted to extend from the tail rotor blade to the portion of the retention strap in a manner to detachably secure the tail rotor blade to the portion of the retention strap, the pitch control link mechanism being adapted to move the tail rotor blade about the blade pitch change axis, the hub-protecting cap comprising:

a cap body portion adapted to be attached to the hub portion when the tail rotor blade is detached from the tail rotor assembly, the cap body portion having a hub socket adapted such that when the cap body portion is attached to the hub portion the pitch change bearing surface of the hub portion is within the hub socket of the cap body portion;

a pin-receiving aperture through the cap body portion, the pin-receiving aperture being sized and located to align with the portion of the retention strap and to receive the retention pin when the cap body portion is attached to the hub portion;

a link-attaching portion extending from the cap body portion, the link-attaching portion being sized and adapted for attachment to the pitch control link mechanism when the cap body portion is attached to the hub portion.

22. A hub-protecting cap as set forth in claim 21 wherein the tail rotor assembly further includes an electrical harness adapted to be electrically coupled to a de-ice mechanism of the tail rotor blade, the hub-protecting cap further comprising an electrical harness-receiving portion, the electrical harness-receiving portion being adapted to receive the electrical harness when the cap body portion is attached to the hub portion.

23. A hub-protecting cap as set forth in claim 21 further comprising a hardware-receiving portion adapted to receive hardware for facilitating reattachment of the tail rotor blade to the tail rotor assembly upon removal of the hub-protecting cap from the hub portion.

24. A hub-proctecting cap set forth in claim 23 further comprising a flexible strap fixed at one end to the cap body portion, the flexible strap being adapted to be wrapped around the cap body portion in a manner to cover the hardware-receiving portion.

* * * * *

UNITED STATES PATENT AND TRADEMARK OFFICE
CERTIFICATE OF CORRECTION

| | |
|---|---|
| PATENT NO. | : 6,715,711 B1 |
| APPLICATION NO. | : 10/405779 |
| DATED | : April 6, 2004 |
| INVENTOR(S) | : Neal W. Muylaert and Christopher T. Duffield |

It is certified that error appears in the above-identified patent and that said Letters Patent is hereby corrected as shown below:

Please amend the specification by inserting the following paragraph after the title:

--This invention was made with Government support under contract no. DAAH23-00-C-0001 awarded by the U.S. Army. The Government has certain rights in the invention.--

Signed and Sealed this
Eighteenth Day of June, 2013

Teresa Stanek Rea
*Acting Director of the United States Patent and Trademark Office*